Nov. 6, 1923.  
H. L. BLOOD  
1,472,824  
PLANER AND SYSTEM OF MOTOR CONTROL THEREFOR  
Filed June 10, 1920   2 Sheets-Sheet 1
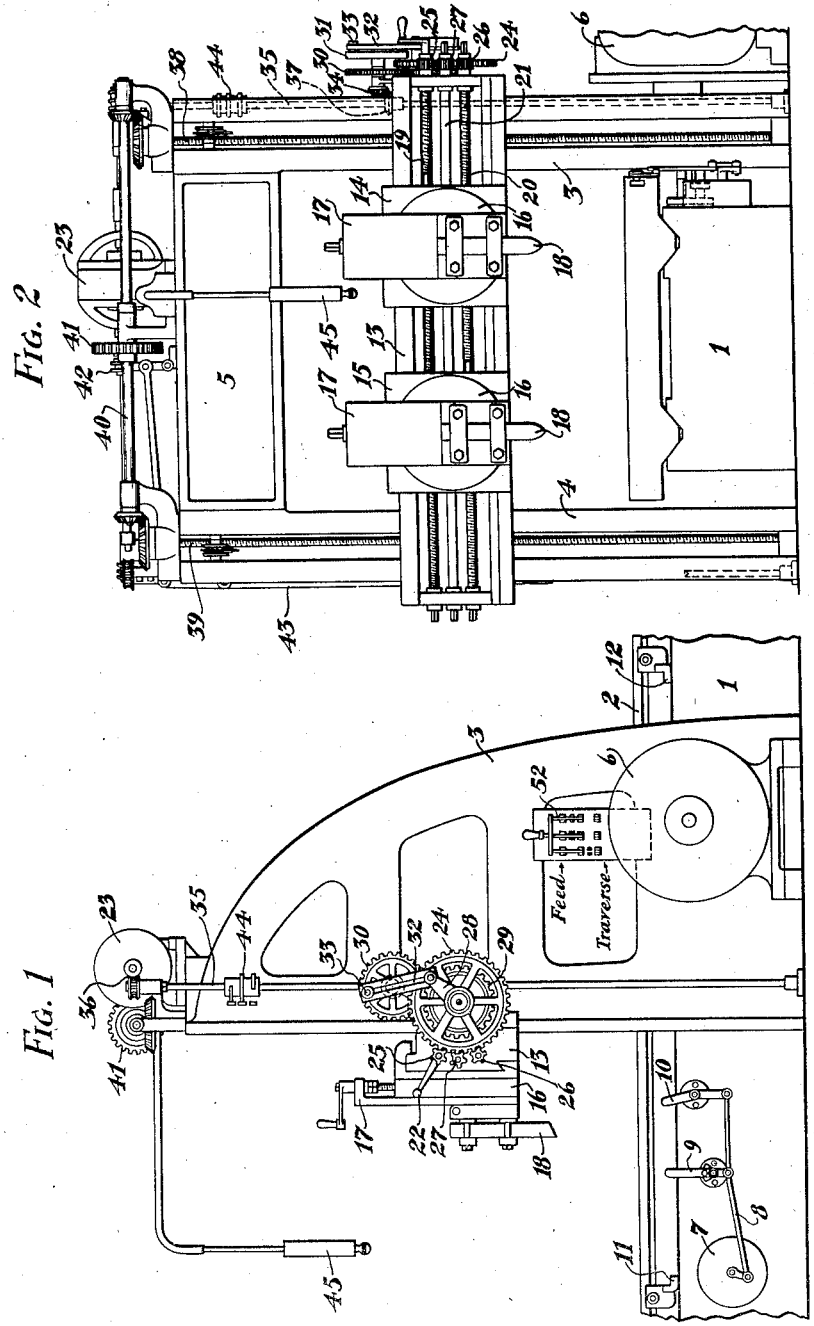
Inventor  
Harold L. Blood  
By S. Jay Teller  
Attorney Inventor
Harold L. Blood
By S. Jay Teller
Attorney

Patented Nov. 6, 1923.

1,472,824

UNITED STATES PATENT OFFICE.

HAROLD L. BLOOD, OF PLAINFIELD, NEW JERSEY, ASSIGNOR TO NILES-BEMENT-POND COMPANY, OF NEW YORK, N. Y., A CORPORATION OF NEW JERSEY.

PLANER AND SYSTEM OF MOTOR CONTROL THEREFOR.

Application filed June 10, 1920. Serial No. 388,058.

*To all whom it may concern:*

Be it known that I, HAROLD L. BLOOD, a citizen of the United States, residing at Plainfield, in the county of Union and State of New Jersey, have invented certain new and useful Improvements in Planers and Systems of Motor Control Therefor, of which the following is a specification.

The invention relates particularly to a planer and a system of motor control therefor such as set forth in the Greenleaf and Blood Patent No. 1,321,203, dated Nov. 11th, 1919. In accordance with the present invention I provide certain improvements which relate particularly to the control and operation of the feed motor when the tools are to be rapidly traversed.

The principal object of the invention is to obtain a more powerful and satisfactory action when the feed motor is being used for traversing the tools rapidly in either direction. To this end I provide connections whereby the series field of the tool feeding motor is connected. Further objects of the invention will be apparent from the following specification and claims.

The accompanying drawings show the embodiment of the invention which I now deem preferable, but it will be understood that various changes may be made and that the drawings are to be understood as merely illustrative and are not to be considered as defining or limiting the scope of the invention, the claims appended to this specification being relied upon for that purpose.

Of the drawings:

Figure 1 is a side elevation of a planer embodying the invention.

Fig. 2 is a front elevation.

Figure 3:
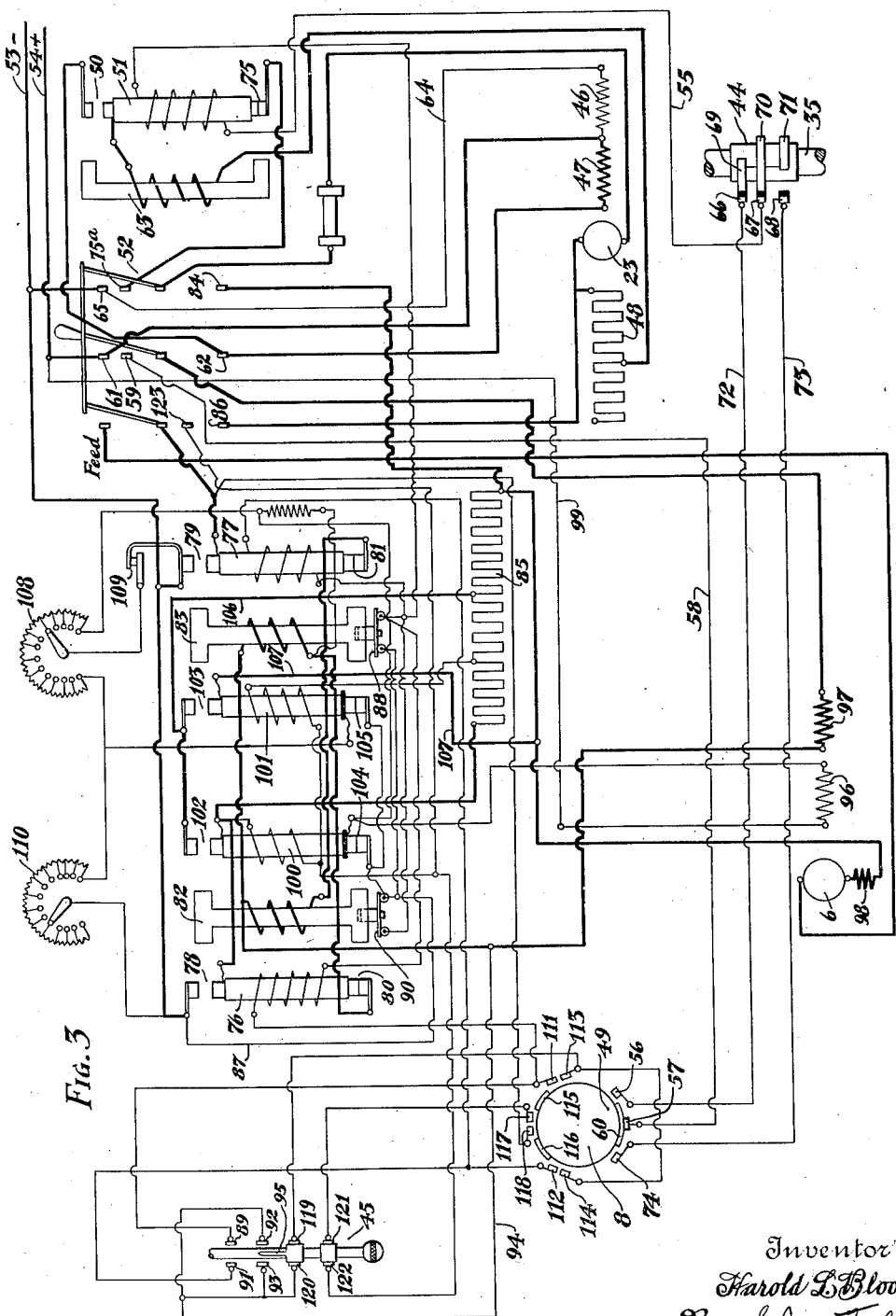
Fig. 3 is a diagram of electrical connections.

Referring particularly to Figs. 1 and 2 of the drawings, 1 represents the planer bed, 2 the reciprocating table, 3 and 4 the uprights or housings and 5 the arch connecting the uprights. Driving mechanism is provided for reciprocating the table 2 on its bed, and so far as certain features of the invention are concerned this driving mechanism can be of any usual or preferred form. I prefer, however, to use an electric motor which is directly geared to the table and which is reversible to effect the reciprocation thereof, such a motor having especial advantages in connection with a planer embodying the more characteristic features of my invention as will fully appear. A reversible electric motor is indicated in the drawings at 6, the gearing connections between it and the table being of any usual or preferred form. When such a motor is used there is provided a suitable controller not shown in Figs. 1 and 2 but fully illustrated diagrammatically in Fig. 3. For operating certain parts of the controller and for other purposes there is provided a pilot switch 7. This switch is operated by means of a rod 8 connected to levers 9 and 10 which are engaged respectively by dogs 11 and 12 secured to the reciprocating table. These dogs are adjustable in position so as to regulate the length of the stroke.

Cooperating with the reciprocating table to act upon work carried thereby are one or more cutting tools. So far as the broader phases of the invention are concerned, the number of tools and the relative positions thereof are immaterial. In the construction illustrated there is a vertically movable cross rail 13 which is fitted to vertical guides on the uprights 3 and 4. Transversely movable along the cross rail 13 are one or more (in this case two) tool heads 14 and 15. The tool heads 14 and 15 are or may be constructed in the usual way, each of them comprising a swivel plate 16 carrying a tool slide 17. The tools 18 are carried by the slides 17. Transverse threaded shafts or screws 19 and 20 are provided to respectively control the transverse movements of the tool heads 14 and 15, and a splined shaft 21 is provided for operating the slides 17 in the usual manner.

If desired, side heads may be provided which are vertically adjustable along the guides on the uprights 3 and 4. Such side heads, however, do not of themselves constitute any part of the present invention and they are therefore omitted from the drawings.

The screws or shafts 19, 20 and 21 can be moved manually when desired, as for instance, by means of a crank 22 as indicated. For moving one or more of the tool heads by power either to effect preliminary adjustment of the tools or to effect feeding thereof during operation of the planer, I provide an independent electric motor which is shown in the drawings at 23, it preferably being mounted upon the arch 5.

In order that the shafts may be rotated by power a spur gear 24 is mounted at one end of the cross rail in position to mesh with pinions 25, 26 and 27 detachably mounted respectively on the ends of the shafts 19, 20 and 21. Each of these pinions is preferably in the form of a "click box" having a reversible ratchet device which, for each operative position of adjustment, permits power transmission from the pinions to the shafts in one direction only. The construction is therefore such that by putting in place or removing the click boxes and by properly adjusting the ratchet devices thereof one or more of the shafts or screws can be intermittently moved in one direction or the other, as desired, when the gear 24 is oscillated; or one or more of the shafts or screws can be continuously moved in one direction or the other, as desired, when the gear 24 is continuously moved.

For actuating the gear 24 there is provided a crank arm 28 at one side of the gear and a gear 29 at the other side thereof, both of these devices being loosely mounted. By means of a suitable clutch mechanism, either the crank 28 or the gear 29 can be connected with the gear 24. A gear 30 meshes with the gear 29 and a feed plate 31 is connected with the crank 28 by means of a connecting rod 32 and an adjustable pin 33, the said gear and feed plate being connected together and driven by means of a bevel gear 34.

A vertical shaft 35 is mounted on the upright 3 and is driven by the motor 23 through worm and wheel gearing at 36. Splined on the shaft 36 is a bevel gear 37 which meshes with the aforesaid bevel gear 34 and thus transmits power to rotate the gear 29 by means of the gear 30 and to oscillate the crank 28 by means of the feed plate 31 and the connecting rod 32. It will be seen that if the motor be operated to rotate the feed plate 31 through a definite angle, as for instance through a whole revolution or a half revolution, and that if the gear 24 be connected with the crank 28, one or more of the shafts 19, 20 and 21 will be rotated in one direction or the other as required through a definite angle, thus moving one or the other or both of the tool heads to the right or to the left as required or moving one or the other or both of the slides 17 upward or downward as required. If the motor 23 be operated continuously in one direction or the other and if the gear 24 be connected with the gear 29, then either or both of the tool heads can be moved continuously in either direction as required or either or both of the slides 17 can be moved continuously in either direction as required.

For the purpose of adjusting the cross rail 13 vertically, two screws 38 and 39 are provided which are connected by means of suitable bevel gearing with a transverse shaft 40 connectible with the motor 23 by means of gearing 41 and a clutch 42 manually operable by means of a lever 43. It will be seen that by engaging the clutch 42 and starting the motor 23 in one direction or the other the cross rail 13 may be raised or lowered as required.

For controlling the flow of current to the feed motor 23, there is provided a motor operated limit switch, it preferably, though not necessarily, being operated by the feed motor itself. This limit switch is indicated at 44 in Fig. 1, it being mounted on the shaft 35. The operation of the limit switch will be explained in connection with the description of the electrical connections. A master switch for effecting the control of one or the other of the motors 6 and 23 is shown at 45. This master switch is preferably connected at the end of a flexible cable which is so supported as to hold the switch at a point within convenient reach of the operator. Because of this preferred form of mounting the master switch is commonly known as a pendant master switch. The full purpose of the master switch and the electrical connections therefor will be explained hereinafter.

Referring now more especially to the electrical connections as shown in Fig. 3, it will be noted that the feed motor is indicated by the reference character 23 as in the other figures. The feed motor is provided with a shunt field winding 46 and with a series field winding 47. The series winding is desirable as it keeps down the starting current and provides a large starting torque. Associated with the motor there is preferably also an adjustable resistance 48.

For controlling the operation of the feed motor a starting switch is provided as indicated at 49, this switch preferably forming a part of the switch 7 heretofore mentioned as a pilot switch operated by the reciprocating table. It will be understood, however, that when reference is made to a table operated switch I mean to include any switch which is operated in synchronism with the table reciprocations and I do not mean to limit myself to a switch directly connected in the way shown. Preferably the starting switch 49 does not control the motor 23 directly but controls it indirectly by means of an electro-magnetic relay switch 50 having an actuating magnet 51. In conjunction with the feed motor there is provided a transfer switch 52 preferably of the three-pole double-throw type. For normal operation of the feed motor to effect intermittent feeding of the tools the transfer switch 52 is in its upper position.

The main leads through which current is supplied to operate the motor 23 and also to provide the motor 6 are indicated at 53 and 54, 53 being the negative lead and 54 the positive lead.

The circuit for the coil of the relay magnet 51 extends from the negative lead 53 to the coil through suitable connections to be presently described, and from the coil it extends through the conductor 55 to a stationary contact 56 of the relay switch 49. The switch 49 is provided with another stationary contact 57 which is connected by means of a conductor 58 with the positive lead 54, the connection extending through an upper intermediate contact 59 on the central pole of the switch 52. A movable contact 60 on the switch 49 is adapted to connect the contacts 56 and 57, thus completing the circuit through the coil of the magnet 51 and causing the core thereof to be lifted to close the switch 50. When the switch 50 is closed a circuit is completed through the feed motor as follows: from the positive lead 54 through the upper central contact 61 of the switch 52, the series field winding 47, the lower central contact 62 of the switch 52, the switch 50, the coil of a blow-out magnet 63, and more or less of the resistance 48 to the armature; and from the armature through the right hand pole of the switch 52 back to the negative lead 53. It will be observed that the shunt field winding 46 is continuously energized by means of a connection 64 extending from the upper contact 65 of the right hand pole of the switch 52. The motor 23 therefore starts operation and by means of the mechanical connections that have been described serves to move one or more of the tools in the desired direction. Making the shunt and series fields of the required strengths and varying the amount of the resistance 48 serves to reduce the danger of injuring the motor in case one of the tools becomes jammed or for any reason fails to move freely.

The operation of the motor will continue until the relay magnet is de-energized to permit the switch 50 to open. The magnet can be de-energized by opening its circuit at the starting switch 49 but preferably there is provided a limit switch which acts automatically to open the circuit after the motor has rotated to a predetermined extent or after a tool or tools have been moved to a predetermined extent. Mention has already been made of the limit switch 44 which is mounted on the shaft 35 and is therefore movable to an extent proportionate to the extent of movement of the motor. The switch 44 is provided with three stationary contacts 66, 67 and 68 and with three connected movable contacts 69, 70 and 71. The contact 70 is a ring continuously engaging the contact 67 and the contacts 69 and 71 are interrupted rings adapted respectively to engage the contacts 66 and 68 alternately as the shaft 35 is turned. To complete the circuit from the coil of the magnet 51 to the switch 49 the conductor 55 is constructed in two parallel sections 72 and 73, the section 72 connecting the contact 66 with the contact 56 and the section 73 connecting the contact 68 with a contact 74 of the switch 49 similar to the contact 56. With the switch 44 in the position shown in Fig. 3 the circuit extends from the conductor 55 through the contacts 67, 70, 69 and 66, the conductor 72, and the contacts 56, 60 and 57 to the conductor 58. As the motor 23 rotates the switch 44 is moved to disengage the contact 69 from the contact 66, thus breaking the relay circuit and causing the switch 50 to open. At or about the same time the contact 71 engages the contact 68, thus partly re-establishing the relay circuit in preparation for the next movement of the cutter. After the switch 50 has been opened and after the motor has been stopped it remains idle until the starting switch 49 is moved to again complete the relay circuit, the circuit this time extending through the conductor 73 instead of the conductor 72 as before. When the circuit is thus completed the motor starts as before and continues operation until the contact 71 is disengaged from the contact 68. In this way the motor is started at intervals as the table reciprocates, the relay circuit being established alternately through the contacts 72 and 73 and the limit switch 44 serving after each starting to stop the motor after rotation to a predetermined extent. It will be observed that during the feeding operation as described the motor operates always in the same direction.

Preferably in order that the motor 23 and the tool heads may not continue movement by momentum after the switch 44 is opened, I provide for short circuiting the motor armature to effect dynamic braking. At the lower end of the core of the magnet 51 there is provided a switch 75 which is open when the motor is in normal operation but which is automatically closed when the switch 50 is opened. When the switch 75 is closed a short circuit extends from the motor armature through the resistance 48, the coil of the blow-out magnet 63, the core of the magnet 51, the switch 75 and the right hand pole of the switch 52 back to the armature. It will be noted that the series field 47 is excluded from the circuit while dynamic braking is taking place. If this series field were left in the circuit it would oppose the shunt field and lessen the braking action.

As already stated, it is frequently desirable to operate the feed motor continuously in order to effect traversing, that is, in order to effect movement of the cross rail vertically or movement of one or more of the tool heads in the desired directions to effect preliminary adjustments. Normally, as stated, the feed motor is under the control of the starting switch 49 and the limit switch 44, which latter switch serves to interrupt the motor movement. In order to effect traversing the limit switch is prevented from acting, thus making it possible for the motor to be operated continuously. Preferably there is provided a master switch supplemental to the starting switch 49 for controlling the motor during traversing, such a master switch being desirable because it is inconvenient (although not impossible) to operate the starting switch 49 manually. The master switch is preferably a pendant switch such as that already briefly mentioned and shown in Fig. 1 at 45.

The transfer switch 52 when moved from its upper to its lower position enables the motor to be operated for traversing in the manner referred to. Such a movement of the transfer switch 52 serves to cut out the limit switch 44. Preferably when a master switch such as 45 is provided movement of the transfer switch 52 also serves to cut out the starting switch 49 by breaking the circuit at 59. This makes it possible to control the motor by means of the master switch 45. It will be noted that the resistance 48 is cut out. Inasmuch as the switches 44 and 49 are cut out the magnet 51 is de-energized and the switch 50 remains open. During traversing therefore the motor is controlled by switches other than the switch 50 which is used during feeding. The switch 75 remains closed but the circuit therefor is broken at 75ª, thus preventing the flow of current through the circuit which normally serves as the braking circuit.

As before stated, the motor operates always in the same direction during feeding, but it will be clear that when the motor is to be used for traversing it must be reversible so as to be capable of moving the tools in either direction at will. Therefore the main switch, in this case the switch 45, is preferably so constructed and connected that it can serve not only to start and stop the motor but also to reverse it. The master switch 45 preferably, though not necessarily, acts indirectly to control the motor, there being provided a relay motor controlling mechanism. This controlling mechanism is adapted to cause the motor to operate in either direction.

So far as the invention is concerned, the controlling mechanism may be of any one of a number of sorts, but I prefer and have shown a mechanism in many respects similar to that set forth in Patent No. 1,003,269 to Keefer. This mechanism comprises two operating magnets 76 and 77 adapted respectively when their cores are lifted to close switches 78 and 79 and open switches 80 and 81. Associated with the said switches there are preferably provided blow-out magnets 82 and 83. When the transfer switch 52 is in its lower position as aforesaid the motor 23 is connected with this controlling mechanism, the left hand pole of the switch being connected with the core of the magnet 77 and the lower right hand contact 84 of the switch 52 being connected through a resistance 85 with the core of the magnet 76. It will be seen that when the switch 78 is closed and the switch 80 opened a circuit for the motor is completed as follows: from the positive lead 54 through the series field 47, the contact 62 and central pole of the switch 52, the coil of the blow-out magnet 82, the switch 81, the core of the magnet 77, the left hand pole and contact 86 of the switch 52, the armature 23, the right hand pole and contact 84 of the switch 52, the resistance 85 and the switch 78 back to the negative lead 53.

The motor 23 being thus connected starts rotation and the rotation continues until the switch 78 is opened and the switch 80 closed. The speed of rotation can be varied by adjusting the resistance 85. When the motor circuit is broken at 78 a short circuit to effect dynamic braking is established as follows: from the armature 23 through the contact 86, the left hand pole of the switch 52, the core of the magnet 77, the switch 81, the coil of the blow-out magnet 82, the coil of the blow-out magnet 83, the switch 80, the core of the magnet 76, the resistance 85, the contact 84 and the right hand pole of the switch 52 back to the armature.

When the switch 79 is closed and switch 81 opened a circuit through the motor is established in a manner similar to that already described except that the current flows through the armature in the opposite direction and the direction of rotation is reversed. The current through the series field 47 is not reversed and this field therefore assists the shunt field 46 as before. When the switch 79 is opened and the switch 81 closed a short circuit to effect dynamic braking is established in the way already described.

For energizing the magnets 76 and 77 relay circuits are provided which are controllable by means of the master switch 45. The circuit for the magnet 76 extends from the negative lead 53 through a wire 87, preferably through a normally closed switch 88 at the lower end of the blow-out magnet 83, and through the coil to a contact 89 of the switch 45. The circuit for the magnet 77 extends through the wire 87 preferably through a normally closed switch 90 at the lower end of the blow-out magnet 82 and through the magnet coil to a contact 91 of the switch 45. The switch 45 is also provided with contacts 92 and 93, each of which is connected with the positive lead 54 by means of a wire 94. The switch 45 has a movable contact 95 which can be moved upward from the position shown in Fig. 3 and turned to the right or the left to connect either the contacts 89 and 92 or the contacts 91 and 93. If 89 and 92 are connected the magnet 76 is energized and the motor rotated in one direction, and if 91 and 93 are connected the magnet 77 is energized and the motor rotated in the other direction. When the contact 95 is moved to central position neither of the magnets is energized and the motor is short circuited for dynamic braking. The aforesaid switches 88 and 90 are connected to be opened by the blow-out magnets 83 and 82 when those magnets are energized. It will therefore be seen that so long as the short circuit current is flowing the magnets will be energized and will hold open the switches 88 and 90, thus preventing the energization of either of the magnets 76 or 77 to reverse the motor.

As was stated at the outset, I prefer a reversible electric motor for driving the planer table. When such a driving motor is used it is possible, and, in fact, preferable, to control it by means of the same controlling mechanism which has been described as adapted for controlling the feed motor to effect traversing. In Fig. 3 the driving motor is indicated by the reference character 6 as in the other figures. The motor is provided with a shunt field winding 96 and with a series winding 97 and preferably with an inter-pole winding 98. The shunt field 96 is connected with the positive lead by means of a wire 99 and is connected with the negative lead through the aforesaid wire 87.

The transfer switch 52 is so connected that the circuit of the drive motor extends therethrough when the switch is in its upper feeding position, the circuit being broken when the switch is moved to its lower traversing position. With the switch in its upper position as aforesaid the driving motor can be started in one direction by closing the switch 78 and opening the switch 80, the following circuit being established: from the positive lead 54 through the central pole of the switch 52, the series winding 97, the coil of the blow-out magnet 82, the switch 81, the core of the magnet 77, the left hand pole of the switch 52 to the motor armature; and from the motor armature through the interpole winding 98, the resistance 85 and the switch 78 back to the negative lead 53.

When the magnet 76 is de-energized to open the switch 78 and close the switch 80 a dynamic short circuit through the motor armature is established as follows: from the armature through the left hand pole of the switch 52, the core of the magnet 77, the switch 81, the coil of the blow-out magnet 82, the coil of the blow-out magnet 83, the switch 80, the core of the magnet 76, the resistance 85 and the inter-pole winding 98 back to the armature. The short circuit current of the motor 6 energizes the magnets 82 and 83 sufficiently to open the switches 88 and 90, thus preventing the energization of the magnets 76 and 77 so long as any considerable short circuit current flows. When the short circuit current drops to a predetermined value the switches 88 and 90 are permitted to close, thus making it possible for one or the other of the magnets 76 and 77 to be energized.

When the magnet 77 is energized to close the switch 79 and open the switch 81 the operation is similar to that already described except that the motor is connected for rotation in the opposite direction.

In order to speed up the motor after starting there are preferably provided suitable accelerating means in the form of supplemental controlling magnets 100 and 101 adapted respectively to close switches 102 and 103 and open switches 104 and 105. Both contacts of the switches 104 and 105 are insulated from the cores of their respective magnets. The operating circuit of the magnet 100 is connected in shunt with the motor armature in such a way that it is adapted to be energized to close the switch 102 and open the switch 104. The closing of the switch 102 serves to short circuit a part of the resistance 85, the circuit extending from the central part of the resistance 85 through a conductor 106 to the switch 102. The operating circuit for the magnet 101 is also connected in shunt with the motor armature and when a part of the resistance 85 is short circuited as aforesaid the increased counter-electro-motive force of the motor causes the magnet 101 to be energized sufficiently to close the switch 102, thus completely short circuiting the resistance 85, the circuit then extending through a conductor 107 to the switch 103 and thence to the switch 102. The magnets 100 and 101 together with the connections therefor do not of themselves constitute any part of the present invention as they are set forth in my copending application for planers and systems of motor control therefor, Serial No. 228,598, filed April 15th, 1918.

In order to further accelerate the motor the switches 104 and 105 are utilized to introduce resistance into the circuit of the shunt field 96. As already stated, the shunt field is initially connected across the main leads without resistance. The opening of the switch 104 breaks this direct connection and places in series with the field more or less of an adjustable resistance 108, the circuit extending either through a normally closed switch 109 or when the switch 109 is open through the said switch 105. When the switch 105 is subsequently opened another adjustable resistance 110 is also placed in series with the shunt field provided that the switch 109 is open. The said switch 109 is connected with the switch 79 so as to be opened when the switch 79 is closed. Inasmuch as the motor 6 is used for driving the planer it is necessary or at least desirable for the speed in the cutting direction to be greater than the speed in the return direction. The switch 78 serves to start the motor in the cutting direction, the switch 79 being then open and the switch 109 consequently being closed. Under these circumstances only a part of the resistance 108 is in series with the shunt field and the motor rotates at a slow speed. This speed can be varied by adjusting the resistance 108. When the motor is to be operated in the return direction the switch 79 is closed and the switch 109 is therefore opened. The circuit for the shunt field therefore extends first through all of the resistance 108 and thence through more or less of the resistance 110. The speed of the motor on the return movement can be varied by adjusting the resistance 110.

The controlling mechanism including the magnets 76 and 77 can be operated in the manner already described by the master switch 45 and such operation is frequently desirable during preliminary adjustments of the tools and of the work on the table. However, during normal operation of the planer it is necessary to provide for the automatic operation of the controlling mechanism to reverse the motor at intervals as the table reciprocates. A table operated device or switch is provided for the operation of the controlling mechanism, this preferably being the before-mentioned pilot switch 7.

In the construction illustrated the said table operated pilot switch 7 is provided with stationary contacts 111 and 112 corresponding respectively with the contacts 89 and 91 of the master switch 45. Other contacts 113 and 114 are provided, these being connected together and corresponding respectively with the contacts 92 and 93 of the master switch 45. The pilot switch 7 has movable contacts 115 and 116 adapted respectively to connect the contacts 111 and 113 and the contacts 112 and 114. When the pilot switch is in one position one pair of contacts is connected to energize one pair of contacts and when the pilot switch is moved at the end of the table reciprocation the first pair of contacts is disconnected and the other pair connected so as to stop the motor and reverse it to drive the table in the opposite direction. There are also two contacts 117 and 118 which are in the circuit of the magnets 100 and 101. These contacts are connected by one or the other of the contacts 115 and 116 so that the said magnets 100 and 101 may be energized whenever the motor is in normal operation. During braking, however, the said magnets are de-energized, thus including all of the resistance 85 in the dynamic short circuit of the motor.

It will be observed that the circuit for the magnet 51 extends through the switches 88 and 90. Therefore when the planer is in normal operation the switch 50 cannot be closed to start the feed motor until the braking current of the main motor has nearly stopped flowing.

Preferably the pendant or master switch 45 is constructed and connected in a manner similar to that set forth in the Keefer reissued Patents Nos. 14,539 and 14,540. When the drive motor is in normal operation the movable element of the master switch 45 is in its lower position as shown in Fig. 3. The switch has contacts 119 and 120 which are connected when the movable element is in its lower position, these contacts being in the circuit which connects the pilot switch contacts 113 and 114 with the positive lead. When the movable element of the master switch is moved upward to effect control of the magnets 76 and 77 the contacts 119 and 120 are disconnected, this rendering the pilot switch inoperative to control the said magnets. This prevents any accidental engagement of the dogs 11 and 12 with the levers 9 and 10 from interfering with the control of the said magnets by means of the master switch. The master switch 45 is preferably also provided with contacts 121 and 122 which are also connected when the movable element is in its lower position. These contacts are in the circuit of the magnets 100 and 101 and when the movable element of the switch is moved upward to control the magnets 76 and 77 the magnets 100 and 101 are rendered inoperative, thus making it impossible for the motor to speed up. Thus the master switch 45 can be used only to operate the drive motor at a slow speed in either direction.

When the feed motor is to be used for traversing and the transfer switch 52 is moved to its lower position as aforesaid it will be seen that the switch serves to interrupt the main circuit of the driving motor, this interruption taking place at the left hand pole of the switch. The feed motor can then be controlled as aforesaid by means of the master switch 45, or in cases in which the master switch is omitted it can be controlled by operating the pilot switch 7 manually. In this connection it will be recalled that the circuit for the switch 49 is interrupted at 59 so that movements of the switch 49 in unison with the pilot switch will have no effect.

As already stated, the magnets 100 and 101 are ordinarily rendered inoperative when the movable element of the master switch is moved upward so as to disconnect the contacts 121 and 122. This prevents the main motor from speeding up when under the control of the master switch. It may however be desirable to permit the feed motor to speed up when it is under the control of the master switch and in this case I preferably provide a supplemental contact 123 at the lefthand pole of the transfer switch 52 so as to complete the circuit for the magnets 100 and 101, which circuit is broken at 121 and 122 and which circuit may also be broken at 117 and 118.

What I claim is:

1. In a planer or other machine having a reciprocating table and an adjustable tool, the combination with the table and the tool, of a main motor for reciprocating the table, a compound electric motor for feeding the tool, means for automatically operating the compound motor intermittently as the table reciprocates to effect feeding, means for operating the compound motor continuously in either direction to effect traversing, and connections for maintaining the direction of current flow through the series field of the compound motor unchanged both when the motor is operated intermittently and when it is operated continuously in either direction.

2. In a planer or other machine having a reciprocating table and an adjustable tool, the combination with the table and the tool, of a main motor for reciprocating the table, a compound electric motor for feeding the tool, means for automatically operating the compound motor intermittently always in the same direction as the table reciprocates to effect feeding, means for operating the compound motor continuously in either direction to effect traversing, and connections for maintaining the direction of current flow through the series field of the compound motor unchanged both when the motor is operated intermittently and when it is operated continuously in either direction.

3. In a planer or other machine having a reciprocating table and an adjustable tool, the combination with the table and the tool, of a compound electric motor for feeding the tool, means for automatically operating the motor intermittently as the table reciprocates to effect feeding, and means for operating the motor continuously in either direction to effect traversing while maintaining the series field-magnet winding effective, the last said means serving to reverse the current through the armature without reversing the current through the series field.

4. In a planer or other machine having a reciprocating table and an adjustable tool, the combination with the table and the tool, of a compound electric motor for feeding the tool, means for automatically operating the motor intermittently as the table reciprocates to effect feeding, means for operating the motor continuously in either direction to effect traversing, connections for rendering the series field effective both when the motor is operated intermittently and when it is operated continuously in either direction, and connections for establishing a braking circuit through the motor armature independently of the series field.

5. In a planer or other machine having a reciprocating table and an adjustable tool, the combination with the table and the tool, of a compound electric motor for feeding the tool, means for automatically operating the motor intermittently as the table reciprocates to effect feeding, means for reversing the current flow through the motor armature to operate the motor continuously in either direction, a transfer switch adapted in one position to render the first said means effective and in another position to render the second said means effective, and circuits joined to the transfer switch for maintaining the direction of current flow through the series field unchanged when the motor is under the control of either of the said means.

6. In a planer or other machine having a reciprocating table and an adjustable tool, the combination with the table and the tool, of a compound electric motor for feeding the tool, means for automatically operating the motor intermittently as the table reciprocates to effect feeding, means for reversing the armature current of the motor to operate it continuously in either direction to effect traversing, a transfer switch adapted in one position to render the first said means effective and in another position to render the second said means effective, and circuits joined to the transfer switch for rendering the series field effective when the motor is under the control of either of the said means, the said connections keeping the series field connected to receive current in a single direction notwithstanding the reversal of current through the armature.

7. In a planer or other machine having a reciprocating table and an adjustable tool, the combination with the table and the tool, of a compound electric motor for feeding the tool, means for automatically operating the motor intermittently as the table reciprocates to effect feeding, connections associated with the said means for establishing a braking circuit through the motor armature independently of the series field, means for operating the motor continuously in either direction to effect traversing, connections associated with the last said means for establishing a braking circuit different from that aforesaid through the motor armature independently of the series field, a transfer switch adapted in one position to render the first said means effective and in another position to render the second said means effective, and connections associated with the transfer switch for rendering the series field effective when the motor is under the control of either of the said means.

8. In a planer or other machine having a reciprocating table and an adjustable tool, the combination with the table and the tool, of a compound electric motor for feeding the tool, means including a switch actuated by the planer table and a circuit controlled thereby for automatically operating the motor intermittently as the table reciprocates to effect feeding, means for operating the motor continuously in either direction to effect traversing, and a transfer switch adapted in one position to render the first said means effective and in another position to render the second said means effective, the said transfer switch when it its second position interrupting the circuit of the table actuated switch.

9. In a planer or other machine having a reciprocating table and an adjustable tool, the combination with the table and the tool, of a compound electric motor for feeding the tool, means including a relay switch for automatically operating the motor intermittently as the table reciprocates to effect feeding, means independent of the relay switch for operating the motor continuously in either direction to effect traversing, and a transfer switch adapted in one position to render the first said means effective and in another position to render the second said means effective.

10. In a planer or other machine having a reciprocating table and an adjustable tool, the combination with the table and the tool, of a compound electric motor for feeding the tool, means including a switch actuated by the planer table and a relay switch, said planer operated switch having a circuit for operating the relay switch to automatically operate the motor intermittently as the table reciprocates to effect feeding, means independent of the relay switch for operating the motor continuously in either direction to effect traversing, and a transfer switch adapted in one position to render the first said means effective and in another position to render the second said means effective, the said transfer switch when in its second position interrupting the circuit of the table actuated switch.

11. In a planer or other machine having a reciprocating table and an adjustable tool, the combination with the table and the tool, of a compound electric motor for feeding the tool, means including a relay switch for automatically operating the motor intermittently as the table reciprocates to effect feeding, a switch connected to be closed whenever the said relay switch is opened and adapted to establish a dynamic short circuit through the motor armature, means independent of the relay switch for operating the motor continuously in either direction to effect traversing, and a transfer switch adapted in one position to render the first said means effective and in another position to render the second said means effective, the said transfer switch when in its second position interrupting the aforesaid dynamic short circuit.

12. In a planer or other machine having a reciprocating table and an adjustable tool, the combination with the table and the tool, of a reversible electric table driving motor, a compound electric motor for feeding the tool, means including a table actuated switch for reversing the drive motor and for starting the feed motor at intervals as the table reciprocates, means for operating the feed motor continuously in either direction to effect traversing, a transfer switch adapted in one position to connect the drive motor for normal operation and the feed motor for intermittent operation and in another position to disconnect the drive motor and to render effective the said means for operating the feed motor continuously, and circuits joined to the transfer switch for maintaining the direction of current flow through the series field of the feed motor unchanged when the motor is under the control of either of the aforesaid means.

13. In a planer or other machine having a reciprocating table and an adjustable tool, the combination with the table and the tool, of a reversible electric table driving motor, a compound electric motor for feeding the tool, means including a table actuated switch for reversing the drive motor, said table actuated switch having a circuit for starting the feed motor at intervals as the table reciprocates, means for operating the feed motor continuously in either direction to effect traversing, and a transfer switch adapted in one position to connect the drive motor for normal operation and the feed motor for intermittent operation and in another position to disconnect the drive motor and to render effective the said means for operating the feed motor continuously, the said transfer switch when in its second position interrupting the circuit of the table actuated switch.

14. In a planer or other machine having a reciprocating table and an adjustable tool, the combination with the table and the tool, of a reversible electric table driving motor, a compound electric motor for feeding the tool, means including a table actuated switch for reversing the drive motor, a relay switch operated by the table actuated switch for starting the feed motor at intervals as the table reciprocates, means independent of the relay switch for operating the feed motor continuously in either direction to effect traversing, and a transfer switch adapted in one position to connect the drive motor for normal operation and the feed motor for intermittent operation and in another position to disconnect the drive motor and to render effective the said means for operating the feed motor continuously.

15. In a planer or other machine having a reciprocating table and an adjustable tool, the combination with the table and the tool, of a reversible electric table driving motor, an electric tool feeding motor, a motor controlling mechanism, table operated switch means for operating the controlling mechanism to reverse the drive motor at intervals as the table reciprocates and for starting the feed motor independently of the controlling mechanism at intervals as the table reciprocates, a transfer switch for placing the feed motor under the control of the controlling mechanism and for disconnecting the drive motor therefrom, a master switch suplemental to the table operated means and adapted for operating the controlling mechanism to start, stop and reverse either motor, motor accelerating means associated with the controlling mechanism and normally serving to accelerate the drive motor, means whereby the accelerating means is rendered ineffective when the drive motor is under the control of the master switch, and means whereby the said accelerating means is rendered effective notwithstanding the last said means when the transfer switch is in position to place the feed motor under the control of the controlling mechanism.

16. In a control system, the combination comprising a reciprocating member, a main motor for operating the reciprocating member, a compound motor, means for automatically operating the compound motor intermittently in the same direction and in accordance with the operation of the reciprocating member, means for reversing the direction of current flow through the compound-motor armature to operate the compound motor continuously in either direction, and circuit connections for maintaining the series field-magnet winding effective at all times when the compound motor is operating and for maintaining the direction of current flow through such winding unchanged.

In testimony whereof I hereto affix my signature.

HAROLD L. BLOOD.